United States Patent
Yukitomo et al.

(10) Patent No.: US 6,240,149 B1
(45) Date of Patent: May 29, 2001

(54) ADAPTIVE TRANSMISSION DIVERSITY APPARATUS AND ADAPTIVE TRANSMISSION DIVERSITY METHOD

(75) Inventors: Hideki Yukitomo, Yokohama; Katsuhiko Hiramatsu, Yokosuka, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/052,976

(22) Filed: Apr. 1, 1998

(30) Foreign Application Priority Data

Feb. 4, 1997 (JP) .................................................. 9-099640

(51) Int. Cl.$^7$ ........................................................ H04L 1/02
(52) U.S. Cl. ........................... 375/347; 375/136; 375/148; 375/233; 342/372; 342/380
(58) Field of Search ............................. 375/144, 148, 375/267, 299, 347, 349, 233, 136; 455/101, 132, 133, 134, 137, 504, 506; 342/380, 372

(56) References Cited

U.S. PATENT DOCUMENTS

| | | | |
|---|---|---|---|
| 5,164,964 | * 11/1992 | Kubo | 375/347 |
| 5,260,968 | * 11/1993 | Gardner et al. | 375/347 |
| 5,351,274 | * 9/1994 | Chennakeshu et al. | 375/347 |
| 5,689,528 | * 11/1997 | Tsujimoto | 375/233 |
| 5,748,683 | * 5/1998 | Smith et al. | 375/347 |
| 5,752,173 | * 5/1998 | Tsujimoto | 455/137 |
| 5,757,845 | * 5/1998 | Fukawa et al. | 375/152 |
| 5,953,366 | * 9/1999 | Naruse et al. | 375/148 |
| 6,047,019 | * 4/2000 | Ishii | 375/140 |

FOREIGN PATENT DOCUMENTS

| | | |
|---|---|---|
| 0595247 | 5/1994 | (EP) . |
| 0837523 | 4/1998 | (EP) . |
| 6196921 | 7/1994 | (JP) . |
| 8316772 | 11/1996 | (JP) . |
| 97/00543 | 1/1997 | (WO) . |
| 97/09793 | 3/1997 | (WO) . |

OTHER PUBLICATIONS

An article by N. Kuroiwa et al., entitled "Design of a Directional Diversity Receiver Using an Adaptive Array Antenna," published in *Electronics & Communication In Japan, Part I–Communications*, vol. 74, No. 7, Jul. 1, 1991, pp. 87–97 (XP000270249).

An article by D. Torrieri et al., entitled "Blind Adaptation Using Maximin Algorithm," published in Proceedings of the Asilomar Conference On Signals, Systems, and Computers, Pacific Grove, Nov. 1–3, 1993, vol. 1, No. CONF. 27, Nov. 1, 1993, pp. 638–642, (XP000463774).

An article by T. Ohgane, entitled "Spectral Efficiency Improvement By Base Station Antenna Pattern Control For Land Mobile Cellular Systems," published in IEICE Transactions On Communicaton, Vol. E77–B, No. 5, May 1995, pp. 598–605, (XP000540889).

An English Language Abstract of JP 6–196921.
An English Language Abstract of JP 8–316772.

* cited by examiner

Primary Examiner—Stephen Chin
Assistant Examiner—Shuwang Liu
(74) Attorney, Agent, or Firm—Greenblum & Bernstein, P.L.C.

(57) ABSTRACT

An adaptive transmission diversity apparatus utilizes a spread spectrum system, detects radiation patterns of direct and indirect waves, which have arrived in a time-shifted manner, by reception radiation pattern controllers. A transmission radiation pattern controller is utilized in accordance with a transmission radiation pattern. The transmission radiation pattern is determined by selecting a pattern from reception radiation patterns obtained by the reception radiation pattern controllers. This can ensure a higher transmission performance.

2 Claims, 5 Drawing Sheets

ADAPTIVE TRANSMISSION DIVERSITY APPARATUS AND ADAPTIVE TRANSMISSION DIVERSITY METHOD

BACKGROUND OF THE INVENTION

1. Field of the Invention

The present invention relates to a transmission diversity technique for spread spectrum communication, and, more particularly, to an adaptive transmission diversity apparatus capable of determining a transmission radiation pattern in accordance with a reception radiation pattern.

2. Description of the Related Art

Figure 1:
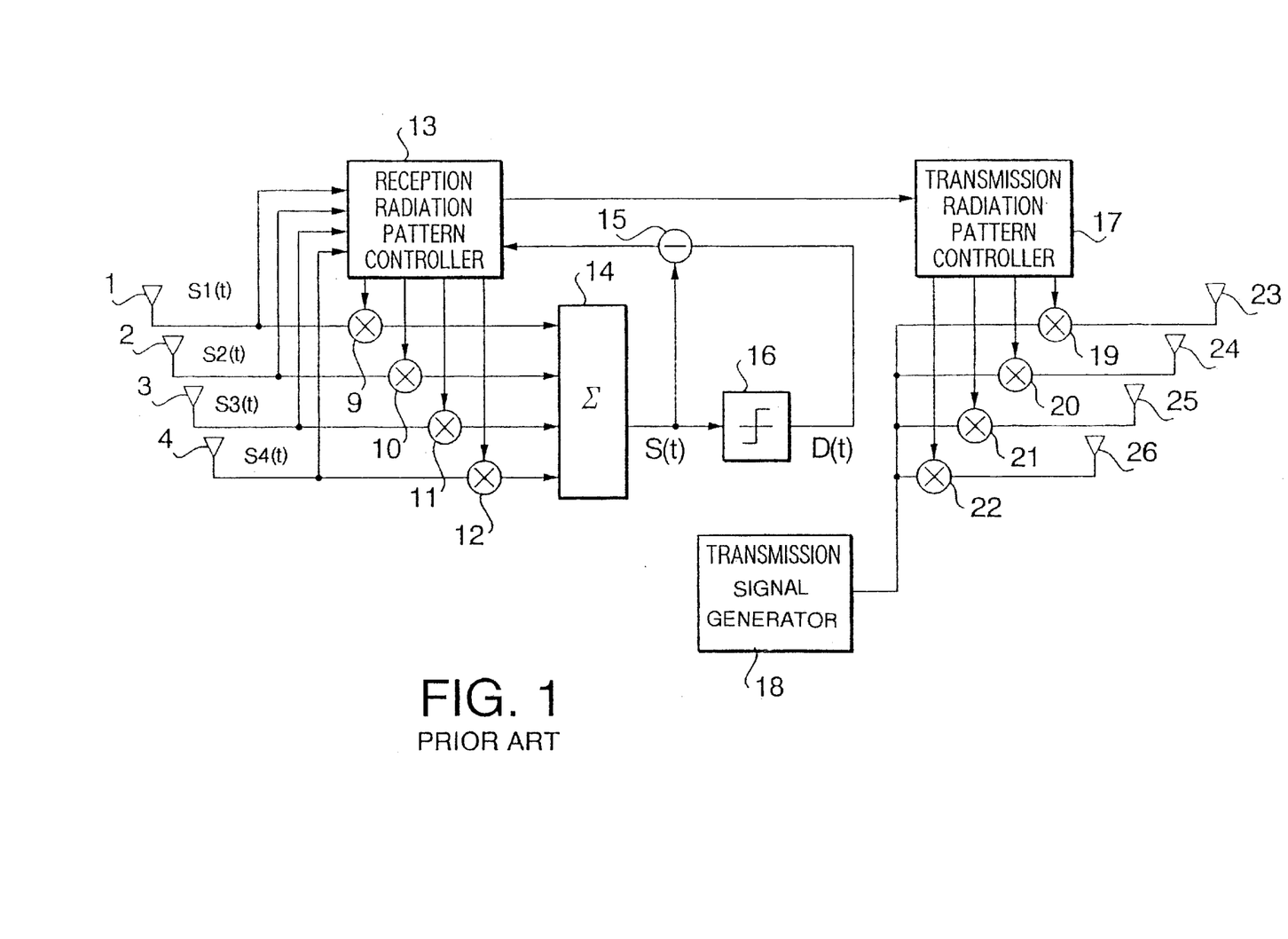
FIG. 1 is a block diagram of a conventional adaptive transmission diversity apparatus.
Figure 2:
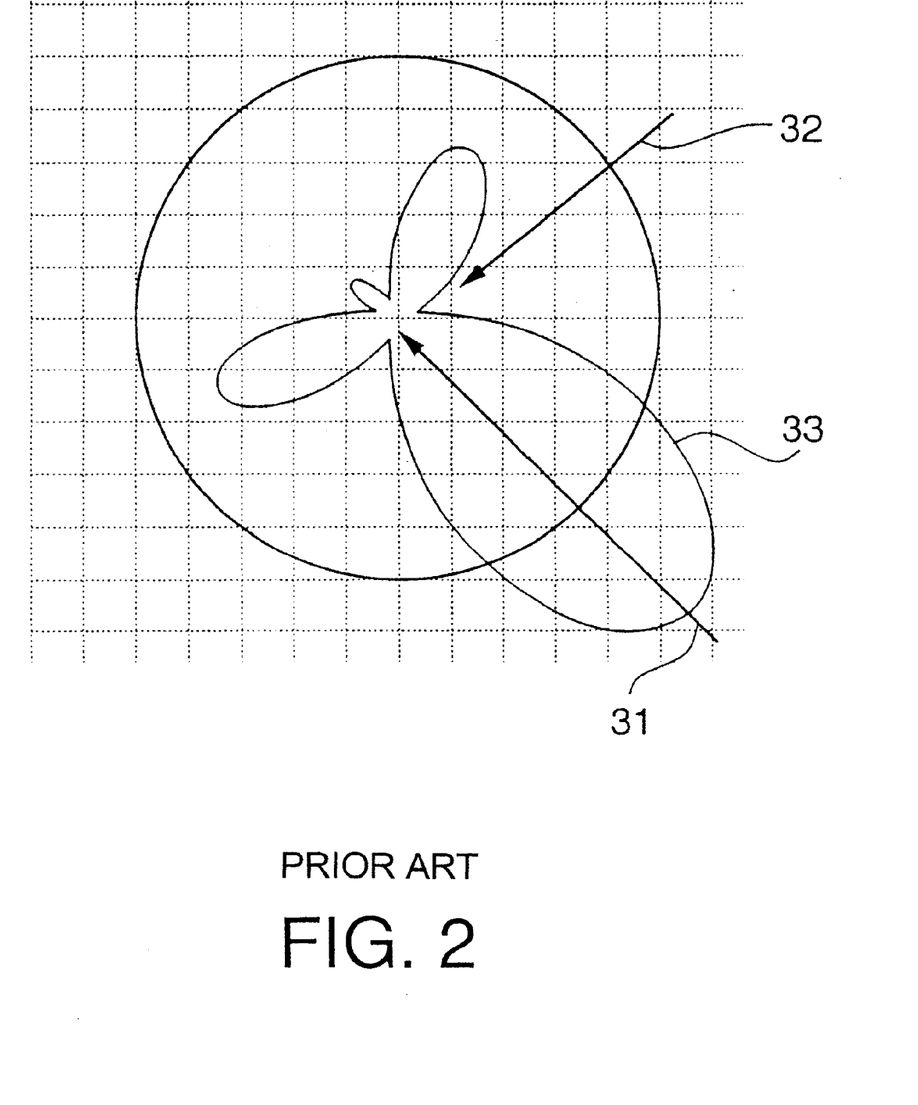
FIG. 2 is a diagram illustrating the relationship between the incoming directions of radio waves and a reception radiation pattern.

A transmission diversity technique for use in a conventional time division multiplex system and a frequency multiplex system will be described below with reference to FIGS. 1 and 2. FIG. 1 presents a block diagram showing the structure of a conventional adaptive transmission diversity apparatus, and FIG. 2 is a diagram illustrating the relationship between the incoming directions of radio waves and a reception radiation pattern.

Referring to FIG. 1, $S_1(t)$, $S_2(t)$, $S_3(t)$ and $S_4(t)$ denote complex signals, which have respectively been received at reception antennas 1, 2, 3 and 4 at time t and have then undergone A/D conversion and quasi-coherent detection. The outputs $W_1(t)$, $W_2(t)$, $W_3(t)$ and $W_4(t)$ of a reception radiation pattern controller 13 are respectively sent to multipliers 9, 10, 11 and 12 which in turn multiply the associated complex signals by the respective outputs. The multiplication outputs are then composed by an adder 14. The output, S(t), of the adder 14 then is given by the following formula (1).

$$S(t) = \sum_{1}^{4} W_i(t) S_i(t) \tag{1}$$

The above process of multiplying signals, received at a plurality of antennas, by the proper complex numbers and then adding the resultant values allows the antennas as a whole to acquire radiation pattern on a plane. When a desired signal is coming from the direction of an arrow 31 in FIG. 2 and an interference signal from the direction of an arrow 32, for example, the reception radiation pattern controller 13 in FIG. 1 controls the radiation pattern as indicated by reference numeral "33" in FIG. 2, so that the desired signal can be received at a strong level and the interference signal at a weak level. This control can enhance the reception performance.

A determination section 16 outputs a result D(t) of determining the composed signal S(t). An error detector 15 outputs a difference S(t)−D(t) between the composed signal S(t) and the determination result D(t). The reception radiation pattern controller 13 renew its output complex number weights $W_1(t)$, $W_2(t)$, $W_3(t)$ and $W_4(t)$ based on the output of the error detector 15 and the complex signals $S_1(t)$, $S_2(t)$, $S_3(t)$ and $S_4(t)$.

Given that the reception signal vector is given by $Sig(t)=(S_1(t), S_2(t), S_3(t), S_4(t))^T$, the outputs of the reception radiation pattern controller, $W(t)=(W_1(t), W_2(t), W_3(t), W_4(t))^T$, can be expressed by the following formula (2). And $\mu$ is coefficient of step.

$$W(t+1) = W(t) + \mu(S(t) - D(t))^T Sig(t) \tag{2}$$

A transmission radiation pattern controller 17 computes weight outputs for transmission in consideration of a frequency difference between transmission and reception, etc. based on the outputs of the reception radiation pattern controller 13. Multipliers 22, 21, 20 and 19 multiply the outputs of the transmission radiation pattern controller 17 by a signal from a transmission signal generator 18. Antennas 23, 24, 25 and 26 convert the signals from those multipliers to RF (Radio Frequency) band signals, and transmit the resultant signals.

The above-described conventional time division and frequency division transmission diversity apparatuses have difficulty in detecting a directly arriving reception wave and an indirectly arriving reception wave reflected by buildings, mountains or the like and separating them from each other taking time shift into consideration. This makes it difficult to form a radiation pattern for each incoming wave, which results in a difficulty in controlling the transmission power with the radiation pattern that corresponds to the received wave.

SUMMARY OF THE INVENTION

Accordingly, it is an object of the present invention to provide an adaptive transmission diversity apparatus which can detect radiation patterns of direct and indirect waves arriving in a time-shifted manner, and determine a proper transmission radiation pattern in accordance with the radiation patterns. It is another object of this invention to provide a specific reference for selecting a proper transmission radiation pattern.

To achieve those objects, this invention provides an adaptive transmission diversity apparatus which employs a spread spectrum system, detects radiation patterns of direct and indirect waves having arrived in a time-shifted manner, by means of reception radiation controllers, and operates a transmission radiation controller in accordance with a transmission radiation pattern which is determined by selecting a proper one of the radiation patterns obtained by the reception radiation pattern controllers or combining those radiation patterns. This can ensure a higher transmission performance.

DETAILED DESCRIPTION OF THE PREFERRED EMBODIMENTS

An adaptive transmission diversity apparatus according to one aspect of the present invention comprises a separating section for separating a received same signal per incoming wave; a reception radiation pattern generating section for determining reception directivities respectively for reception timings for the separated incoming waves; a transmission radiation pattern generating section for determining a transmission radiation pattern by selecting a proper one of, or combining, the reception radiation patterns; and a transmitting section for transmitting a signal in accordance with the transmission radiation pattern.

An adaptive transmission diversity apparatus according to another aspect of this invention comprises a separating section for separating a reception signal into a direct wave and an indirect wave; a reception radiation pattern generating section for determining reception directivities respectively for reception timings for the separated direct wave and indirect wave; a transmission radiation pattern generating section for determining a transmission radiation pattern by selecting a proper one of, or combining, the reception radiation patterns; and a transmitting section for transmitting a signal in accordance with the transmission radiation pattern.

By separating a received same signal per incoming wave and generating a transmission radiation pattern by selecting a proper one of, or combining the reception radiation patterns from the individual reception signal processing systems in the above-described manner, the transmission radiation pattern can be controlled optimally with an improved transmission precision, and power consumption on the transmission side can be reduced. In this case, increasing the number of incoming waves to be caught can further enhance the transmission performance.

In the adaptive transmission diversity apparatus according to this invention, selection of a proper one of the reception radiation patterns by the transmission radiation pattern generating section is carried out by comparing outputs of a plurality of reception signal processing systems, connected in parallel to an antenna, with one another. Further, in the adaptive transmission diversity apparatus according to the present invention, the outputs of the plurality of reception signal processing systems are compared with reception signal powers of the respective reception signal processing systems. Furthermore, in the adaptive transmission diversity apparatus according to this invention, the outputs of the plurality of reception signal processing systems are compared with ratios of desired signal power to interference signal power of the respective reception signal processing systems.

The transmission radiation pattern can easily be acquired by generating a transmission radiation pattern based on the reception radiation pattern selected in the above manner. The use of reception signal power can further facilitate the acquisition of the transmission radiation pattern. Furthermore, the use of the ratios of desired signal power to interference signal power can allow the transmission radiation pattern to be obtained with a higher precision.

In the adaptive transmission diversity apparatus according to the present invention, combination of the reception radiation patterns by the transmission radiation pattern generating section is carried out based on either reception powers of outputs of a plurality of reception signal processing systems, connected in parallel to an antenna, or ratios of desired signal power to interference signal power of the reception signal processing systems.

Combining the reception radiation patterns this way can provide a more proper transmission radiation pattern and can reduce interference on other transmission signals. Further, the transmission power can be suppressed, thus reducing the power consumption.

An adaptive transmission diversity apparatus according to a further aspect of the present invention comprises a plurality of reception signal processing systems for multiplying respective output signals, acquired by de-spreading signals received at a plurality of antennas by means of matched filters, sliding correlator and so on, by respective output signals of reception radiation pattern controllers and then adding resultant signals together to provide an output; a composing section for Rake composing on outputs of the plurality of reception signal processing systems; an error detecting section for acquiring differences between an output of the composing section and the outputs of the reception signal processing systems; a controlling section for determining output values to be sent to said multipliers in the reception radiation pattern controllers from outputs of the error detector and outputs of the matched filters; a detecting section for inputting the outputs of the plurality of reception signal processing systems and computing reception signal powers or ratios of desired signal power to interference signal power; a transmission radiation pattern controller for inputting outputs of the detecting section and determining transmission directivities in accordance with an output of the reception radiation pattern controller of the reception signal processing systems which provides greater reception power or a greater ratio of desired signal power to interference signal power; and a transmission controlling section for multiplying a transmission signal by an output of the transmission radiation pattern controller and transmitting a resultant signal from an antenna.

An adaptive transmission diversity apparatus according to a still further aspect of the present invention comprises a plurality of reception signal processing systems for multiplying respective output signals, acquired by de-spreading signals received at a plurality of antennas by means of matched filters, by respective output signals of reception radiation pattern controllers and then adding resultant signals together to provide an output; a composing section for Rake composing on outputs of the plurality of reception signal processing systems; an error detecting section for acquiring differences between an output of the composing section and the outputs of the reception signal processing systems; a controlling section for determining output values to be sent to said multipliers in the reception radiation pattern controllers from outputs of the error detecting section and outputs of the matched filters; a detector for receiving the outputs of the plurality of reception signal processing systems and computing reception signal powers or ratios of desired signal power to interference signal power ; a transmission radiation pattern controller for inputting outputs of the detecting section and determining transmission directivities by composing outputs of the plurality of reception radiation pattern controllers based on either the reception powers or the ratios of desired signal power to interference signal power; and a transmission controlling section for multiplying a transmission signal by an output of the transmission radiation pattern controller and transmitting a resultant signal from an antenna.

More specific apparatus structures are apparent from the above description.

The present invention is not particularly limited to those apparatuses described above, but the same operation and effects as discussed above invention can also be provided by an adaptive transmission diversity method which comprises the steps of separating a received same signal per incoming wave; generating reception radiation patterns for determining reception directivities respectively for reception timings for the separated incoming waves; generating a transmission radiation pattern by selecting one of, or composing, the reception radiation patterns based on the incoming waves; and transmitting a signal in accordance with the generated transmission radiation pattern.

This method can be implemented more surely and easily by separating a received same transmission signal per incoming wave by a plurality of reception signal processing systems connected in parallel to an antenna, and generating a radiation pattern based on results of performing comparison and determination on outputs of the plurality of reception signal processing systems.

Preferred embodiments of this invention will now be described below in detail with reference to the accompanying drawings.

First Embodiment

Figure 3:
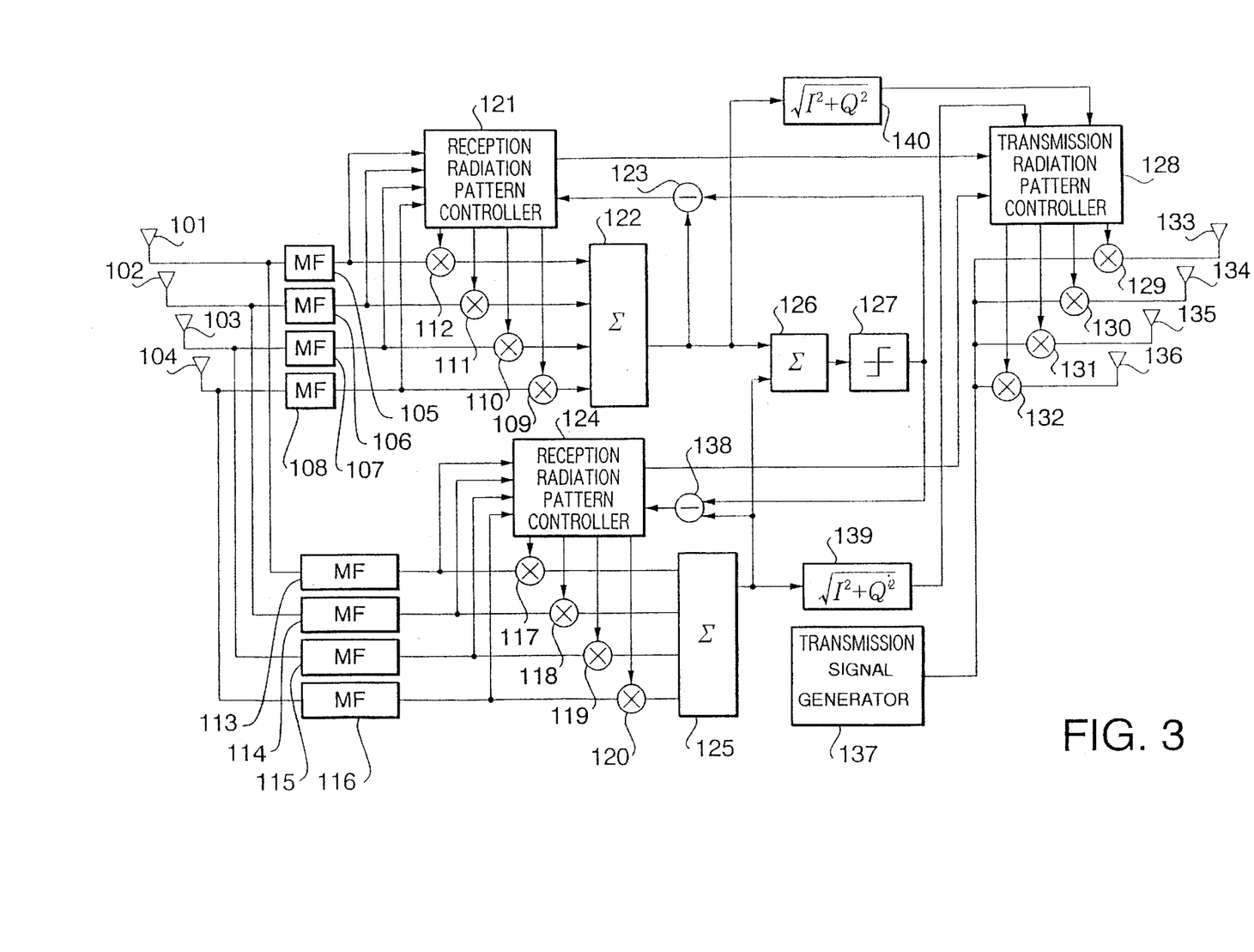
FIG. 3 is a block diagram showing the structure of an adaptive transmission diversity apparatus according to a first embodiment of the present invention.
Figure 4:
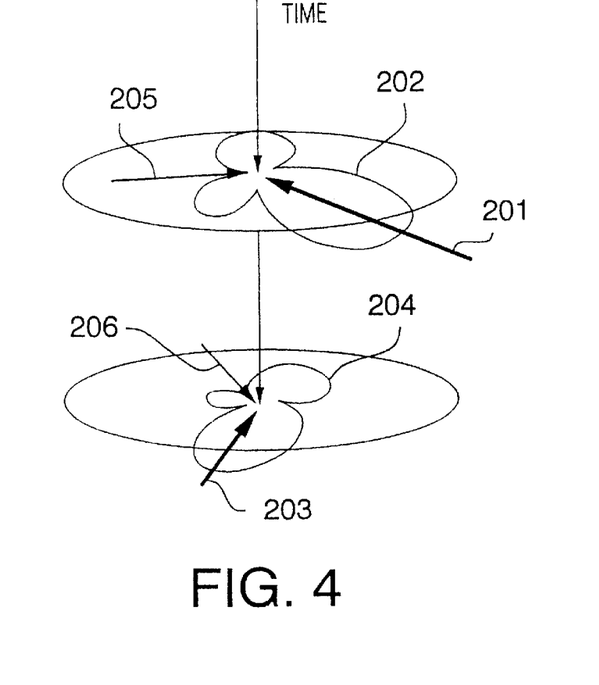
FIG. 4 is a diagram depicting the relationship between the incoming directions of radio waves and a reception radiation pattern according to the present invention.
Figure 5:
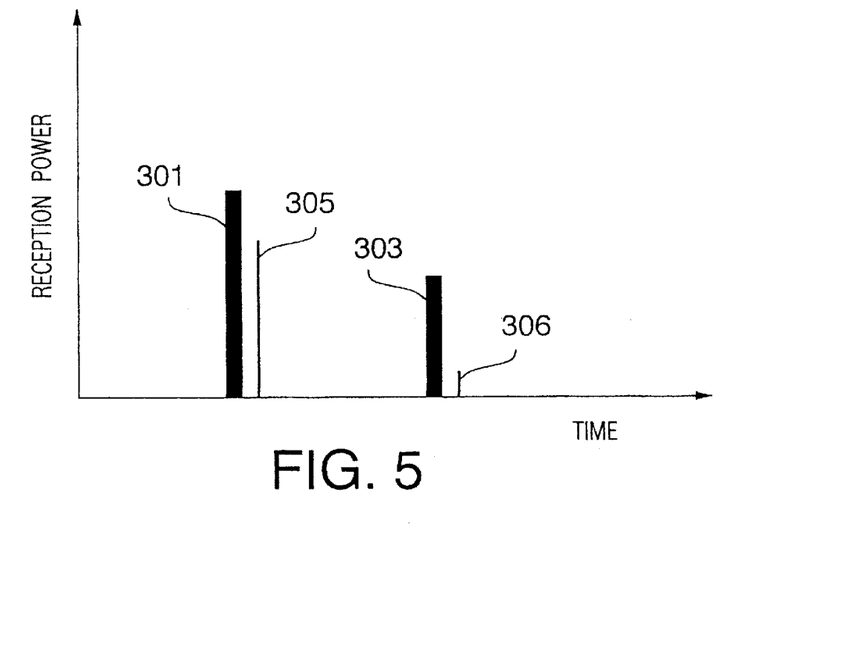
FIG. 5 is a diagram illustrating the relationship between the arrival times of radio waves and reception power according to the present invention.

FIG. 3 is a block diagram showing the structure of an adaptive transmission diversity apparatus according to the first embodiment of this invention, and FIG. 4 is a diagram depicting the relationship between the incoming directions of radio waves and a radiation pattern. FIG. 5 is a diagram illustrating the relationship example between the arrival times of radio waves and power.

In the adaptive transmission diversity apparatus shown in FIG. 3, signals received at a plurality of reception antennas 101, 102, 103 and 104 are subjected to A/D conversion and de-spread in matched filters 105, 106, 107 and 108. Multipliers 112, 111, 110 and 109 multiply the outputs of those matched filters 105 to 108 by the outputs of a reception radiation pattern controller 121. An adder 122 adds the outputs of the multipliers 109 to 112.

Matched filters 113, 114, 115 and 116 perform A/D conversion and a de-spreading operation on the signals received at the antennas 101 to 104. Multipliers 117, 118, 119 and 120 multiply the outputs of the matched filters 113 to 116 by the outputs of a reception radiation pattern controller 124. An adder 125 adds the outputs of the multipliers 117 to 120. The parallel arrangement of similar reception signal processing systems is employed here to capture waves which arrive at different timings.

A Rake device 126 is a circuit that Rake composes the output of the adder 122 and the output of the adder 125, and outputs the composed signal to a determining circuit 127. This determining circuit 127 makes a decision to restore Rake-composed (signal-processed) data to original signals of "1's" and "0's." The output of the determining circuit 127 is output both to an error detector 123, which acquires a difference between the output of the determining circuit 127 and the output of the adder 122, and an error detector 138, which acquires a difference between the output of the determining circuit 127 and the output of the adder 125.

The reception radiation pattern controller 121 controls values to be output to the multipliers 112 to 115 based on the outputs of the matched filters 105 to 108 and the output of the error detector 123. Likewise, the reception radiation pattern controller 124 controls values to be output to the multipliers 117 to 120 based on the outputs of the matched filters 113 to 116 and the output of the error detector 138.

Power detectors 139 and 140 compute powers of the reception signals from the outputs of the adders 122 and 125, respectively, and output to a transmission radiation pattern controller 128. This transmission radiation pattern controller 128 controls the transmission radiation pattern by selecting one of the outputs of the reception radiation pattern controllers 121 and 124 which shows greater reception power of the desired signal.

A transmission signal output from a transmission signal generator 137 is composed with the output of the transmission radiation pattern controller 128 by multipliers 129, 130, 131 and 132, and resultant signals are transmitted from antennas 133, 134, 135 and 136.

While four antennas are used in this embodiment, the amount of computation can be reduced by decreasing the number of antennas and the performance can be improved by increasing that number.

The operation of the thus constituted adaptive transmission diversity apparatus will be discussed below in detail.

The reception signals received at the reception antennas 101 to 104 undergo processes, such as band conversion to a base band from an RF (Radio Frequency) band or an IF (Intermediate Frequency) band and demodulation, before they are input to the matched filters 105 to 108. The matched filters 105 to 108 de-spread the input signals and send their outputs to the multipliers 112 to 109. The multipliers 109 to 112 multiply the outputs of the matched filters 105 to 108 by the output of the reception radiation pattern controller 121.

The adder 122 adds the outputs of the multipliers 109 to 112 together. Given that the vector representation of the outputs of the matched filters 105 to 108 at time t is expressed by $Sig_1(t) = \{S_{11}(t), S_{12}(t), S_{13}(t), S_{14}(t)\}^T$, and the output of the reception radiation pattern controller 121 is $W1(t) = \{W_{11}(t), W_{12}(t), W_{13}(t), W_{14}(t)\}^T$, for example, the output of the adder 122, $S_1(t)$, can be expressed as the following formula (3):

$$S_1(t) = \sum_1^4 w_{1i}^*(t)^T S_{1i}(t) \tag{3}$$

The matched filters 113 to 116 de-spread the inputted signals in such a way as to capture waves which arrive at different timings from those for the matched filters 105 to 108. The multipliers 117 to 120 respectively multiply the outputs of the matched filters 113 to 116 by the output of the reception radiation pattern controller 124. The adder 125 adds the outputs of the multipliers 117 to 120 together. Given that the vector representation of the outputs of the matched filters 113 to 116 at time t is expressed by $Sig_2(t) = \{S_{21}(t), S_{22}(t), S_{23}(t), S_{24}(t)\}^T$ and the output of the reception radiation pattern controller 124 is $W2(t) = \{W_{21}(t), W_{22}(t), W_{23}(t), W_{24}(t)\}^T$, the output of the adder 125, $S_2(t)$, can be expressed as the following formula (4):

$$S_2(t) = \sum_1^4 w_{2i}^*(t)^T S_{2i}(t) \tag{4}$$

The rake device 126 composes the outputs of the adders 122 and 125. This operation is performed in such a manner that the composed output S(t) becomes the maximum ratio as given by the following formula (5).

$$S(t) = \frac{1}{|S_1(t)|^2 + |S_2(t)|^2} \cdot (|S_1(t)| \cdot S_1(t) + |S_2(t)| \cdot S_2(t)) \tag{5}$$

Note that the composing may be accomplished by using another method. Further, more Incoming waves may be composed by using greater number of matched filters and reception radiation pattern controllers.

The determining circuit 127 determines the composed reception signal. With the determination result being D(t), the error detectors 123 and 138 output differences between this determination result and the original signals. For example, the error detector 123 outputs D(t)−Sig$_1$(t) to the reception radiation pattern controller 121, and the error detector 138 outputs D(t)−Sig$_2$(t) to the reception radiation pattern controller 124. Based on those outputs, the reception radiation pattern controllers 121 and 124 renew their outputs.

For instance, the output of the reception radiation pattern controller 121 should be set as given by the following formula (6).

$$W_1(t+1)=W_1(t)+\mu(D(t)-\text{Sig}_1(t))^T \text{Sig}_1(t) \quad (6)$$

Likewise, the output of the reception radiation pattern controller 124 should be set as given by the following formula (7).

$$W_2(t+1)=W_2(t)+\mu(D(t)-\text{Sig}_2(t))^T \text{Sig}_2(t) \quad (7)$$

While the transmission signal generator 137 prepares data to be transmitted and controls the radiation pattern of the transmission signal in accordance with the output of the transmission radiation pattern controller 128. The power detectors 139 and 140 calculate the powers of the reception signals, |S$_1$(t)| and |S$_2$(t)| from the outputs of the adders 122 and 125, and give the powers to the transmission radiation pattern controller 128.

The transmission radiation pattern controller 128 acquire weights W$_1$(t) and W$_2$(t) from the reception radiation pattern controller 121 and the reception radiation pattern controller 124. For example, the transmission radiation pattern controller 128 computes W$_1$(t) as a transmission weight when |S$_1$(t)|>|S$_2$(t)|, and computes a transmission weight by using W$_2$(t) when otherwise.

For instance, at the timing of the desired signal arriving at the time as indicated by an arrow 201 in FIG. 4, the reception radiation pattern controller 121 forms a radiation pattern as indicated by "202", whereas at the timing of the desired signal arriving at the time as indicated by an arrow 203, the reception radiation pattern controller 124 forms a radiation pattern as indicated by "204". Note that arrows 205 and 206 indicate the incoming directions of interference signals at the respective timings.

FIG. 5 shows the reception powers of individual incoming radio waves at this time. "301" shows the reception power of the desired signal that arrives at the timing of an arrow 301, "303" shows the reception power of the desired signal that arrives at the timing of an arrow 303, and "305" and "306" show the reception powers of incoming interference signals.

The transmission radiation pattern controller 1218 compares the levels of the reception powers with one another, and selects "202" as the transmission radiation pattern as the reception power for the arrow 201 is greater. In accordance with this transmission radiation pattern, a control signal output from the transmission radiation pattern controller 128 and the transmission signal from the transmission signal generator 137 are composed by the multipliers 129 to 132. The composed signals are transmitted from the antennas 133 to 136. When the frequency band differs between reception and transmission, the transmission radiation pattern controller 128 performs frequency band conversion too.

Furthermore, before signal transmission from the antennas 133 to 136, spreading, D/A conversion and conversion to IF and RF bands from the base band are executed. At this time, if the transmission antennas 133 to 136 are designed as a time division multiplex or frequency division multiplex type, the transmission antennas 133 to 136 can be combined with the reception antennas.

According to the first embodiment, as described above, the transmission radiation pattern controller compares the levels of the reception powers of the reception signals with one another to determine the optimal transmission radiation pattern, thereby selecting the optimal radiation pattern and reducing interference on other transmission signals, so that the overall transmission power can be reduced.

Second Embodiment

Figure 6:
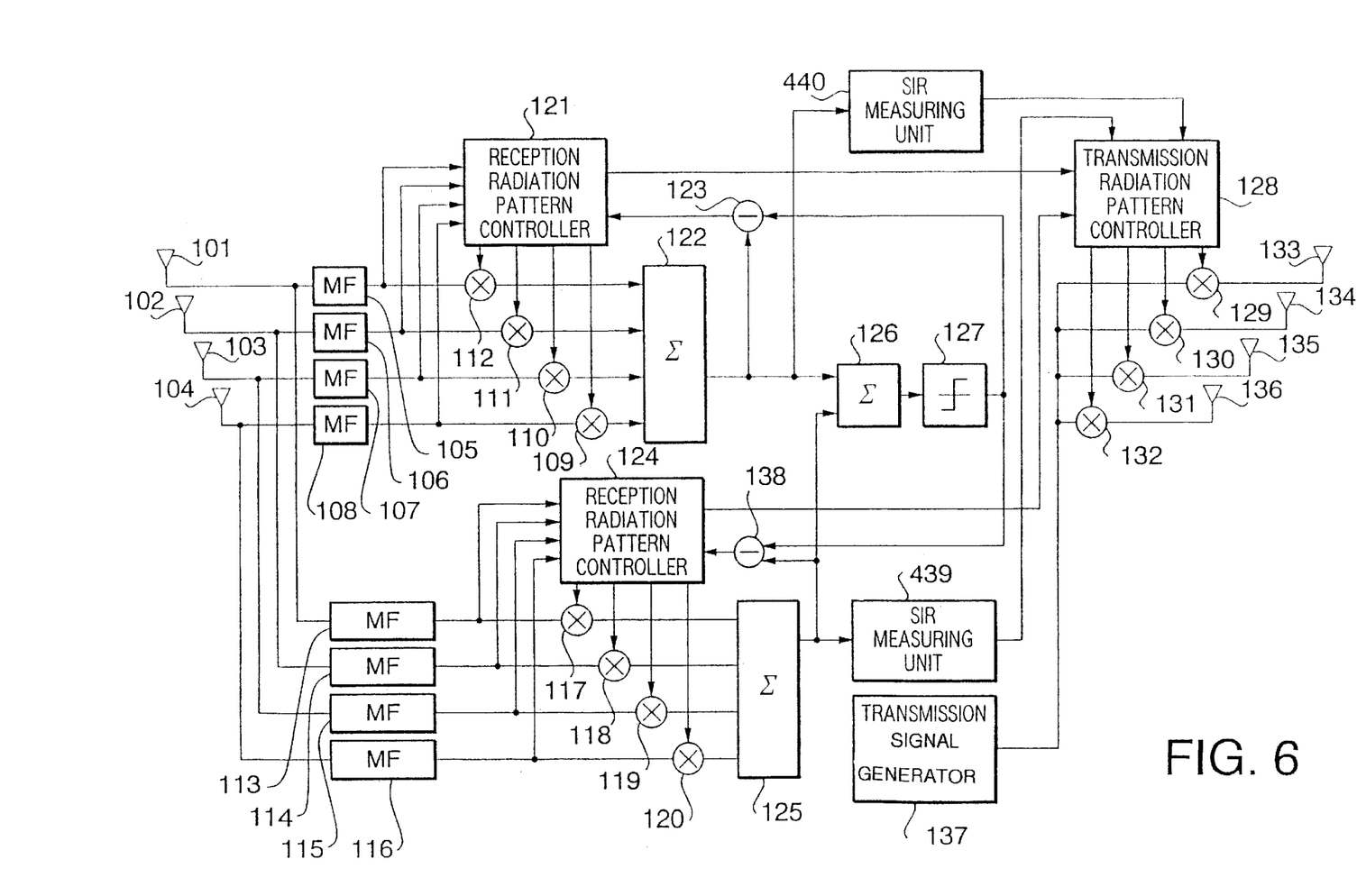
FIG. 6 is a block diagram showing the structure of an adaptive transmission diversity apparatus according to a second embodiment of the present invention.

An adaptive transmission diversity apparatus according to the second embodiment of the present invention will now be discussed. FIG. 6 is a block diagram showing the structure of the adaptive transmission diversity apparatus according to the second embodiment of the present invention. Since the structure of the adaptive transmission diversity apparatus according to the second embodiment is substantially the same as the structure shown in FIG. 3, same reference numerals are given to those components and methods to omit the detailed description.

The structure shown in FIG. 6 differs from that shown in FIG. 3 in the structure of the use of SIR measuring units 439 and 440 as the transmission radiation pattern controller 128 and the power detectors for computing the powers of reception signals. While the powers of the reception signals are computed by reception signal powers |S$_1$(t)| and |S$_2$(t)| in the first embodiment, the SIR measuring units 439 and 440, which detect powers, compute the power ratios of the desired signals to interference signals contained in the reception signals by the outputs of the adders 122 and 125 and send the computation results to the transmission radiation pattern controller 128.

The transmission radiation pattern controller 128 acquire weights W$_1$(t) and W$_2$(t) from the reception radiation pattern controller 121 and the reception radiation pattern controller 124 as the first embodiment. At the timing of the desired signal arriving at the time as indicated by the arrow 201 in FIG. 4, the reception radiation pattern controller 121 forms a radiation pattern as indicated by "202," whereas at the timing of the desired signal arriving at the time as indicated by the arrow 203, the reception radiation pattern controller 124 forms a radiation pattern as indicated by "204."

The reception powers of individual incoming radio waves then are illustrated in FIG. 5. "301" shows the reception power of the desired signal that arrives at the timing of the arrow 201, "303" shows the reception power of the desired signal that arrives at the timing of the arrow 203, and "305" and "306" show the reception powers of incoming interference signals. As the ratio of the desired signal power to the interference signal power for the radiation pattern 204 is greater than the ratio for the radiation pattern 202, the output value of the SIR measuring unit 440 becomes greater than that of the SIR measuring unit 439, for example.

The transmission radiation pattern controller 128 compares the ratios of the desired signal power to the interference signal power, calculated at the respective timings, with each other based on the outputs of the SIR measuring units 439 and 440 to thereby select the transmission radiation pattern 204. In accordance with this transmission radiation pattern, the control signal output from the transmission radiation pattern controller 128 and the transmission signal output from the transmission signal generator 137 are composed by the multipliers 129 to 132. The composed signals are transmitted from the antennas 133 to 136.

According to the second embodiment of this invention, as the above, since the transmission radiation pattern controller determines the transmission radiation pattern based on the ratios of the powers of the desired signals in the reception signals to the interference signal powers, it is possible to form a transmission radiation pattern with a higher precision than is obtained in the first embodiment and to further reduce interference on other transmission signals.

Third Embodiment

An adaptive transmission diversity apparatus according to the third embodiment of this invention will now be discussed. Because this embodiment differs from the first embodiment only in the structure of the transmission radiation pattern controller 128 and how to calculate the power of the reception signal, this embodiment will be discussed with reference to FIG. 3. It is assumed here that reception waves as shown in FIGS. 4 and 5 have been received under the same reception conditions as those of the first embodiment.

The transmission radiation pattern controller 128 measures the ratio of the desired signal power to the interference signal power at each timing, and composes the patterns from the reception radiation pattern controllers 121 and 124 in such a way that the ratio becomes maximum. For example, the transmission radiation pattern controller 128 composes the transmission patterns (complex numbers to be given to the multipliers), Ws(t), as given by the following formula (8) by using the outputs $W_1(t)$ and $W_2(t)$ of the reception radiation pattern controllers 121 and 124 and the desired signal reception powers s1 and s2 at the respective timings. At this time, the same effects can be acquired by using the ratio of the desired signal power to the interference signal power as used in the second embodiment instead of the desired signal reception powers used in the first embodiment.

$$Ws(t) = \frac{1}{s1+s2} \cdot \left( \sqrt{s1}\, W1(t) + \sqrt{s2}\, W2(t) \right) \quad (8)$$

According to the third embodiment of this invention, the transmission radiation pattern controller can form a more optimal transmission radiation pattern by composing the reception radiation patterns that have been formed by the individual reception radiation pattern controllers, and can thus reduce interference on other transmission signals. Further, the transmission power can be suppressed, thus reducing the power consumption.

As apparent from the foregoing description according to, a received same transmission signal is separated per incoming wave and a transmission radiation pattern is generated by selecting one of, or composing, the reception radiation patterns of the individual reception signal processing systems. This can ensure optimal control of the transmission radiation pattern, can improve the transmission precision and can reduce the power consumption on the transmission side. Further, the transmission performance can be improved by capturing a larger number of incoming waves according to this invention.

Furthermore, the transmission radiation pattern can be acquired easily by generating the transmission radiation pattern based on the selected reception radiation pattern. The use of the reception signal power in this case can further facilitate the acquisition of the transmission radiation pattern. Furthermore, the use of the ratio of the desired signal power to the interference signal power can allow the transmission radiation pattern to be obtained with a higher accuracy.

Moreover, composing the reception radiation patterns can permit the formation of a more optimal transmission radiation pattern and can further reduce interference on other transmission signals. It is also possible to suppress transmission power, which results in lower power consumption.

What is claimed is:

1. An adaptive transmission diversity apparatus comprising:

a plurality of reception signal processing systems, each reception signal processing system multiplies respective output signals, acquired by de-spreading signals received at a plurality of antennas by matched filters, by respective output signals of reception radiation pattern controllers and then adds all resultant signals to provide an output;

a composing system that performs Rake composing on outputs of said plurality of reception signal processing systems;

an error detector that acquires differences between an output of said composing system and outputs of said reception signal processing systems;

said reception radiation pattern controllers determining output values to be sent to multipliers in said reception signal processing systems from outputs of said error detector and outputs of said matched filters;

a detector that inputs outputs of said plurality of reception signal processing systems and that computes reception signal powers or ratios of desired signal power to interference signal power;

a transmission radiation pattern controller that inputs outputs of said detector and that determines a transmission directivity in accordance with an output of said reception radiation pattern controller provided in one of said reception signal processing systems which provides greater reception power or a greater ratio of desired signal power to interference signal power; and a transmission controller that multiplies a transmission signal by an output of said transmission radiation pattern controller and transmits a resultant power from an antenna.

2. An adaptive transmission diversity apparatus comprising:

a plurality of reception signal processing systems, each reception signal processing system multiplies respective output signals, acquired by de-spreading signals received at a plurality of antennas by matched filters, by respective output signals of reception radiation pattern controllers and then adds all resultant signals to provide an output;

a composing system that performs Rake composing on outputs of said plurality of reception signal processing systems;

an error detector that acquires differences between an output of said composing system and outputs of said reception signal processing systems;

said reception radiation pattern controllers determining output values to be sent to multipliers in said reception signal processing systems from outputs of said error detector and outputs of said matched filters;

a detector that inputs outputs of said plurality of reception signal processing systems and that computes reception signal powers or ratios of desired signal power to interference signal power;

a transmission radiation pattern controller that inputs outputs of said detector and that determines a transmission directivity by composing outputs of said plurality of reception radiation pattern controllers based on either reception powers or ratios of desired signal power to interference signal power; and a transmission controller that multiplies a transmission signal by an output of said transmission radiation pattern controller and transmits a resultant power from an antenna.

* * * * *